US012456503B2

(12) United States Patent
Funakoshi et al.

(10) Patent No.: US 12,456,503 B2
(45) Date of Patent: Oct. 28, 2025

(54) PROGRAMMABLE SIGNAL PROCESSING APPARATUS

(71) Applicant: CANON KABUSHIKI KAISHA, Tokyo (JP)

(72) Inventors: Shuto Funakoshi, Kanagawa (JP); Yohei Horikawa, Tokyo (JP); Kazuma Sakato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 18/505,372

(22) Filed: Nov. 9, 2023

(65) Prior Publication Data
US 2024/0161799 A1   May 16, 2024

(30) Foreign Application Priority Data

Nov. 14, 2022 (JP) .................. 2022-182060

(51) Int. Cl.
G11C 7/22 (2006.01)
G11C 7/10 (2006.01)

(52) U.S. Cl.
CPC ............ G11C 7/222 (2013.01); G11C 7/1003 (2013.01); G11C 7/1066 (2013.01)

(58) Field of Classification Search
CPC ..... G11C 7/222; G11C 7/1003; G11C 7/1066; H03K 19/17724
See application file for complete search history.

(56) References Cited

U.S. PATENT DOCUMENTS 9,118,310 B1 * 8/2015 Ganusov .......... H03K 19/17748
2014/0002154 A1 * 1/2014 Jang ...................... H03L 7/0816
327/158

FOREIGN PATENT DOCUMENTS

JP    2006-025379 A   1/2006
JP    2008-293535 A   12/2008

* cited by examiner

Primary Examiner — Xiaochun L Chen
(74) Attorney, Agent, or Firm — Cowan, Liebowitz & Latman, P.C.

(57) ABSTRACT

A programmable signal processing apparatus comprises a plurality of ALUs and a control unit that performs control for configuring a targeted circuit based on received information. The plurality of ALUs include a first type of ALU with one input and multiple outputs and a second type of ALU with two inputs and one output. The first type of ALU delays input data and outputs a plurality of pieces of data with different delay amounts. The second type of ALU generates one or two delayed data and performs an operation on the one or two data. The second ALU does not delay the one or two data in a state where supply of a clock signal to a plurality of registers in the second ALU is cut off.

10 Claims, 13 Drawing Sheets

F I G. 5C
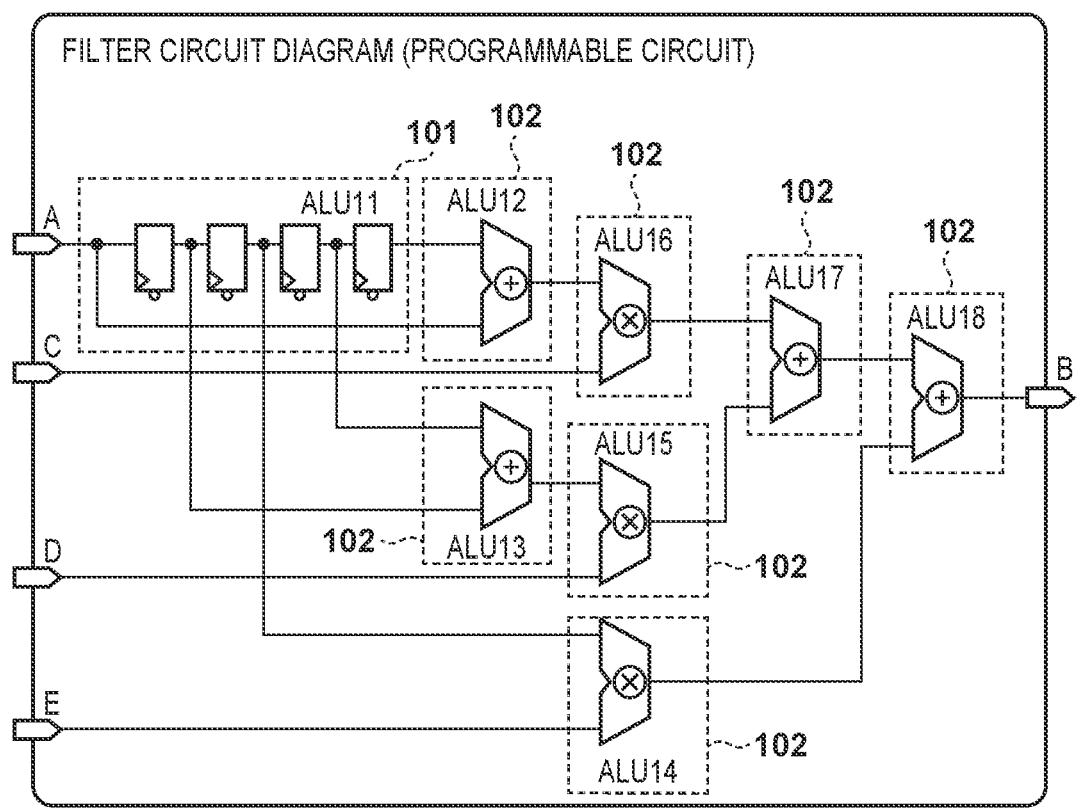

PROGRAMMABLE SIGNAL PROCESSING APPARATUS

BACKGROUND OF THE INVENTION

Field of the Invention

The present invention relates to a programmable signal processing apparatus.

Description of the Related Art

Programmable circuits such as a field-programmable gate array (FPGA) and a programmable logic device (PLD) are known. Such programmable circuits are configured as a circuit for performing operations for a desired purpose using a plurality of operation apparatuses or arithmetic logic units (ALU). Also, with such a programmable circuit, the contents of the processing can be switched by rewriting the configuration information specifying the functions of the ALUs. For example, as with the configuration described in Japanese Patent Laid-Open No. 2006-25379, the configuration information can be selectively rewritten for the plurality of ALUs.

An FPGA is configured from small blocks such as lookup tables (LUT) and implements large-scale functions by connecting these via programmable wiring lines. A programmable circuit with small blocks such as LUTs as components is referred to as a fine-grained configuration. Fine-grained configurations are very flexible. However, compared to an application specific integrated circuit (ASIC), which is a non-programmable dedicated circuit, FPGAs tend to be larger in terms of area. Regarding this, in the FPGA described in Japanese Patent Laid-Open No. 2008-293535 for example, the components of the FPGA are arithmetic logic units (ALU) configured as a large block including a combination of an operation device, a selector, a delay circuit, and the like. A programmable circuit with large blocks as components is referred to as a coarse-grained configuration and has higher area efficiency than a fine-grained configuration.

However, a programmable circuit implements a plurality of processing circuits using pre-designed ALUs. Thus, compared to an ASIC specialized for only one processing circuit, there is redundant processing and high power consumption. Take an example of a programmable circuit being used to execute the processing of a filter circuit to delay one signal by a plurality of delay amounts and add together the signals of each delay amount. Since a programmable circuit with a coarse-grained configuration requires a delay to be implemented at each ALU, a large amount of power is consumed compared to an ASIC in which delay elements can be used in common.

SUMMARY OF THE INVENTION

In consideration of such known technical problems, the present invention according to an embodiment realizes a programmable signal processing apparatus that can reduce power consumption.

According to an aspect of the present invention, there is provided a programmable signal processing apparatus comprising: a plurality of arithmetic logic units (ALUs); a CPU; and a memory that stores a program that, when executed by the CPU, causes the programmable signal processing apparatus to function as: a control unit configured to set settings for configuring a targeted circuit using the plurality of ALUs on a basis of information relating to settings for a connection relationship of the plurality of ALUs and information relating to settings for each one of the plurality of ALUs, wherein the plurality of ALUs include a first type of ALU and a second type of ALU, the first type of ALU includes a first selection circuit that selects input data, and a first delay circuit that delays input data selected by the first selection circuit based on a clock signal and outputs a plurality of pieces of data with different delay amounts, the second type of ALU includes a second selection circuit that selects two pieces of data from a plurality of pieces of data including the plurality of pieces of data with different delay amounts from the first type of ALU and output data from another second type of ALU, according to settings set by the control unit, and outputs the two pieces of data as first data and second data, a second delay circuit that delays at least one of the first data and the second data by an amount according to the settings using a plurality of daisy-chained registers and then outputs the at least one of the first data and the second data, and an operation circuit that performs an operation according to the settings set by the control unit on data output from the second delay circuit, the second delay circuit includes a clock gate control circuit that controls supply and cutoff of a clock signal to the plurality of registers, and outputs the at least one of the first data and the second data without a delay in a state where supply of the clock signal to the plurality of registers is cut off.

According to another aspect of the present invention, there is provided a programmable signal processing apparatus comprising: a plurality of arithmetic logic units (ALUs); a CPU; and a memory that stores a program that, when executed by the CPU, causes the programmable signal processing apparatus to function as: a control unit configured to set settings for configuring a targeted circuit using the plurality of ALUs on a basis of information relating to settings for a connection relationship of the plurality of ALUs and information relating to function settings for each one of the plurality of ALUs, wherein each of the plurality of ALUs includes a selection circuit that selects two pieces of data from a plurality of pieces of data including data from another one of the plurality of ALUs according to settings set by the control unit, and outputs the two pieces of data as first data and second data, a delay circuit that delays each of the first data and the second data output from the selection circuit with a delay amount according to the settings set by the control unit, an operation circuit that performs an operation, of which type is according to the settings set by the control unit, on the first data and the second data output from the delay circuit, and a plurality of output terminals that outputs an operation result of the operation circuit, and outputs a plurality of pieces of data with different delay amounts of one of the first data and the second data delayed by the delay circuit.

Further features of the present invention will become apparent from the following description of exemplary embodiments (with reference to the attached drawings).

BRIEF DESCRIPTION OF THE DRAWINGS

FIGS. 5A to 5C are block configuration diagrams illustrating the configuration of a filter circuit according to the first embodiment.

DESCRIPTION OF THE EMBODIMENTS

Figure 1:
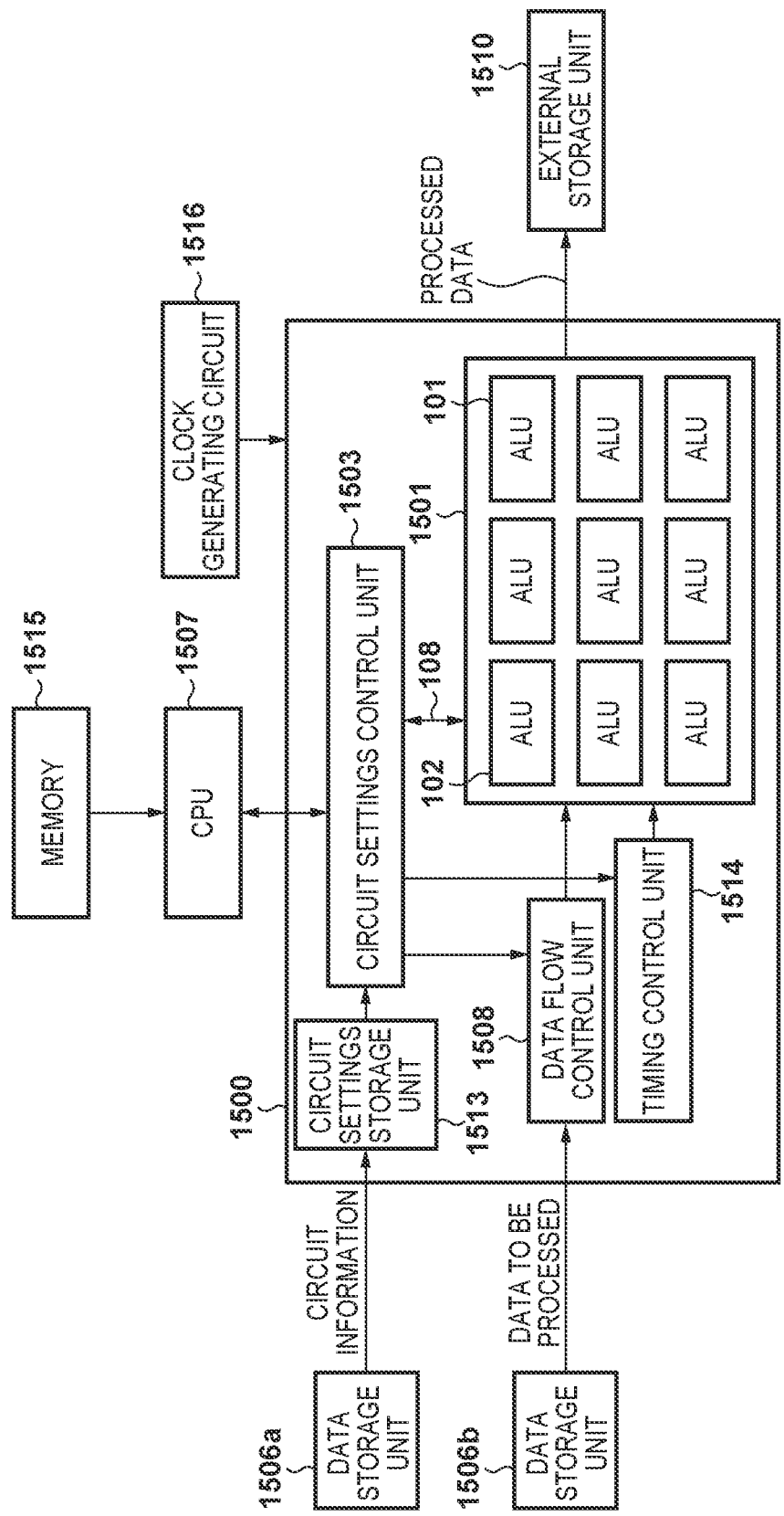
FIG. 1 is a block configuration diagram illustrating a signal processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating an example of the configuration of a system using a programmable signal processing apparatus 1500 according to the first embodiment. A CPU 1507 controls the entire system. A data storage unit 1506a stores circuit information of the programmable signal processing apparatus 1500. A data storage unit 1506b stores data (data to be processed) to be processed by the programmable signal processing apparatus 1500. An external storage unit 1510 stores data (processed data) processed by the programmable signal processing apparatus 1500. Memory 1515 stores programs executed by the CPU 1507 and various types of data.

The programmable signal processing apparatus 1500 according to the present system (hereinafter, referred to simply as the signal processing apparatus 1500) is configured as a single chip integrated circuit (IC), for example. The signal processing apparatus 1500 includes a programmable circuit unit 1501, a circuit settings control unit 1503, a circuit settings storage unit 1513, a timing control unit 1514, and a data flow control unit 1508.

The programmable circuit unit 1501 includes a plurality of arithmetic logic units (ALUs). The plurality of ALUs include a first type, ALU 101, and a second type, ALU 102. The programmable circuit unit 1501 includes a plurality of each type of ALU. Note that the ALUs 101 and the ALUs 102 included in the programmable circuit unit 1501 are not particularly limited in terms of number. The programmable circuit unit 1501 uses a combination of one or more ALU 101 and one or more ALU 102 to process the data to be processed stored in the data storage unit 1506b and output the processing result to the external storage unit 1510 as processed data.

The two types of ALUs 101 and 102 included in the programmable circuit unit 1501 will now be described.

The ALU 102 is a 2-input 1-output operation device. The ALU 102 is selectively input with two from among a plurality of signals or pieces of data on the basis of information of the circuit settings from the circuit settings control unit 1503 and performs various types of operations according to the circuit settings. In the following description, the terms "signal" and "data" are used interchangeably. Note that the ALU 102 can also select, as the data to be input, data stored in the data storage unit 1506b or the output data of another ALU. In this example, the information of the circuit settings includes information for selecting the input source (data to be input) and information of settings values such as the type of operation and the like.

The ALU 101 has 1 input and multiple outputs. The ALU 101 is selectively input with one signal from among a plurality of signals on the basis of information of the circuit settings from the circuit settings control unit 1503. Also, the ALU 101 outputs n+1 number of signals of the selected signal delayed by 0, 1, 2, . . . , n cycles. Here, n is a natural number. In this example, the information of the circuit settings includes information indicating the input source selected by the ALU 101.

By using a combination of the plurality of ALUs 101 and the plurality of ALUs 102, the desired processing circuit can be configured.

Note that in this example, the programmable circuit unit 1501 includes the two types of ALUs, ALU 101 and ALU 102. But the programmable circuit unit 1501 may include three of more types of ALUs. For example, the programmable circuit unit 1501 may include a 3-input 1-output ALU for performing ternary operations with one ALU, for example.

The circuit settings control unit 1503 described below references the circuit settings a plurality of times. As described below, by prestoring the circuit settings in the circuit settings storage unit 1513 inside the signal processing apparatus 1500 from the data storage unit 1506a, the circuit settings control unit 1503 can read out the circuit settings at a high speed.

The circuit settings control unit 1503 reads out and decodes the information of the circuit settings stored in the circuit settings storage unit 1513. Then, the circuit settings control unit 1503 transfers the information of the circuit settings obtained by decoding to the data storage unit of each ALU to be used inside the programmable circuit unit 1501. Also, as described below, the circuit settings control unit 1503 sets the control information required for flow control of the input processing data for the data flow control unit 1508.

The timing control unit 1514 outputs a load signal indicating the update timing for the circuit settings of the plurality of ALUs 101 and ALUs 102 at a timing based on control by the circuit settings control unit 1503. Also, the timing control unit 1514 calculates the term and timing for performing operations for each ALU.

A clock generating circuit 1516 generates an operation clock for the signal processing apparatus 1500. The clock signal from the clock generating circuit 1516 is supplied to each unit of the signal processing apparatus 1500. Each unit of the signal processing apparatus 1500 operates in accordance with the clock signal from the clock generating circuit 1516.

The data flow control unit 1508 controls the data to be processed input into the programmable circuit unit 1501. Thus, the data flow control unit 1508 performs flow control of the data to be processed on the basis of the control information received from the circuit settings control unit 1503.

The data storage unit 1506a is temporary storage for storing the circuit settings to be used by the signal processing apparatus 1500 according to the present embodiment and is configured of SRAM or the like.

The data storage unit 1506b is temporary storage for storing the data to be processed to be used by the signal processing apparatus 1500 according to the present embodiment and is configured of SRAM or the like. The data storage unit 1506b is also used as a work area of the CPU 1507 described below.

The CPU 1507 executes operation processing and control processing according to a program stored in the memory 1515.

The external storage unit 1510 is an apparatus that stores the data of the processing result by the signal processing apparatus 1500. The external storage unit 1510 may be a CompactFlash (CF) (registered trademark) or SD card, a HDD, or the like, but is not limited by type.

Figure 2:
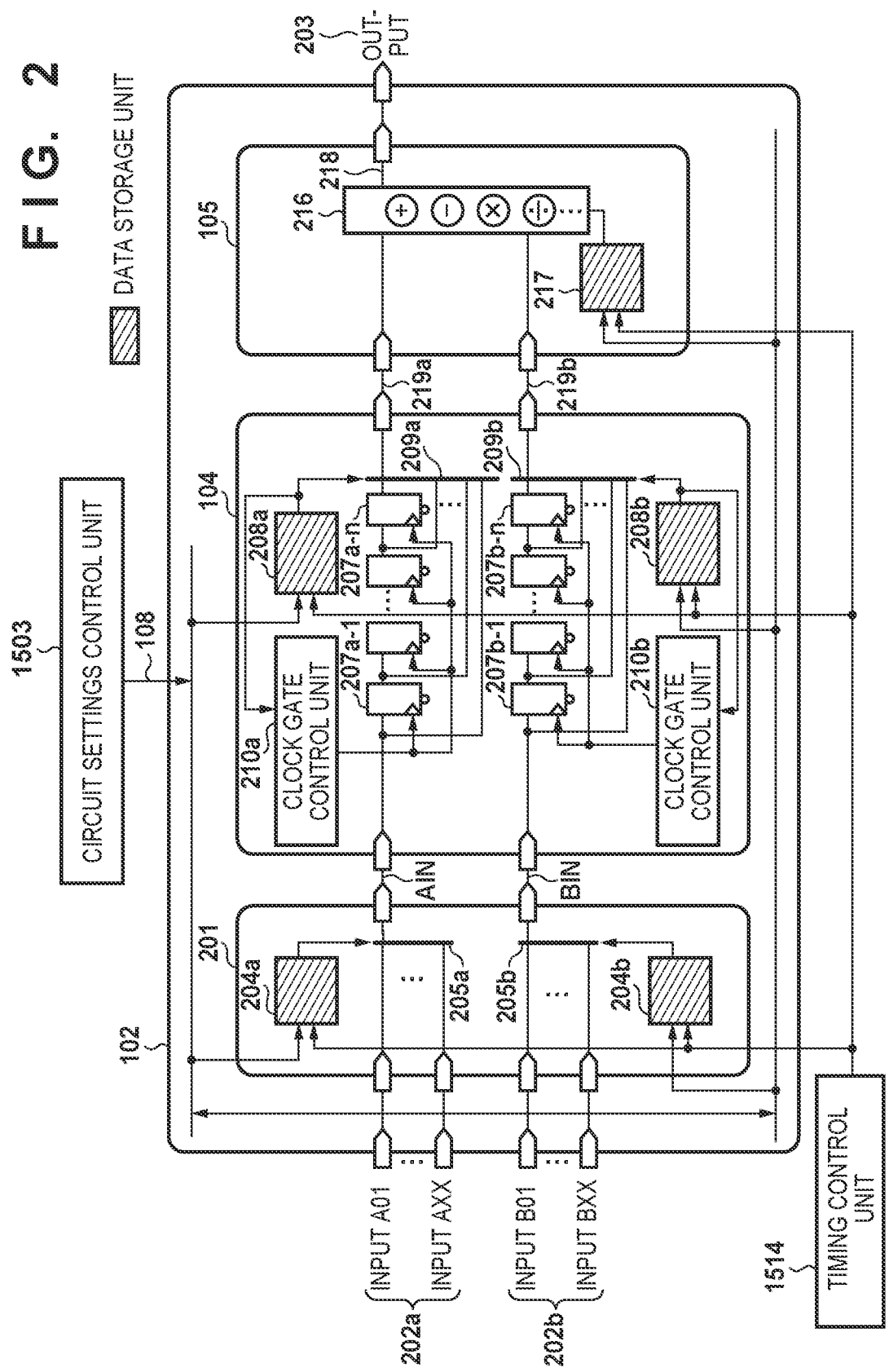
FIG. 2 is a block configuration diagram illustrating the configuration of a first ALU according to the first embodiment.

FIG. 2 is a block diagram illustrating the configuration of the ALU 102 (2-input 1-output ALU) according to the first embodiment. The ALU 102 includes an input selection circuit 201, a delay circuit 104, and an operation circuit 105.

The input selection circuit 201 includes data storage units 204a and 204b and selectors 205a and 205b. The data storage units 204a and 204b each store data supplied from the circuit settings control unit 1503 when the load signal output from the timing control unit 1514 is high. Also, the data storage units 204a and 204b retain stored data when the load signal is not high.

Then, the selector 205a selects one of a plurality of inputs A01 to Axx indicated by reference sign 202a on the basis of the data stored in the data storage unit 204a. In other words, the data storage unit 204a stores instruction data associated with selection for the selector 205a. The selector 205a supplies the selected data in the delay circuit 104 as input AIN, which is one of the two inputs of the ALU 102.

In a similar manner, the selector 205b selects one of a plurality of inputs B01 to Bxx indicated by reference sign 202b on the basis of the data stored in the data storage unit 204b. Then, the selector 205b supplies the selected data in the delay circuit 104 as input BIN, which is the other one of the two inputs of the ALU 102.

As described above, the input selection circuit 201 can select data from the data flow control unit 1508 as well as select the output from another ALU.

The delay circuit 104 includes registers 207a-1 to 207a-n, registers 207b-1 to 207b-n, data storage units 208a and 208b, selectors 209a and 209b, and clock gate control units 210a and 210b.

The data storage units 208a and 208b each store data supplied from the circuit settings control unit 1503 when the load signal output from the timing control unit 1514 is high. Also, the data storage units 208a and 208b retain stored data when the load signal is not high.

The clock gate control unit 210a controls the supply and cutoff of the clock signal to the registers 207a-1 to 207a-n on the basis of the data supplied from the circuit settings control unit 1503. When the clock signal is cutoff, the registers 207a-1 to 207a-n essentially do not operate. In other words, in a case where the clock signal is cutoff, the power consumed by the registers 207a-1 to 207a-n is zero or negligibly low. In other words, the clock gate control unit 210a can be said to control the driving and non-driving of the registers 207a-1 to 207a-n.

In a similar manner to the clock gate control unit 210a, the clock gate control unit 210b controls the supply and cutoff of the clock signal to the registers 207b-1 to 207b-n on the basis of the data supplied from the circuit settings control unit 1503.

The registers 207a-1 to 207a-n are daisy-chained. In a case where the clock signal is supplied from the clock gate control unit 210a, the registers 207a-1 to 207a-n each latch the data supplied from upstream according to the clock signal. Then, the registers 207a-1 to 207a-n each output the latched data to the selector 209a or another register downstream. Herein, the input AIN received from the input selection circuit 201 is defined as $AIN_{ta}$ and includes time information. In this case, the register 207a-1 retains and outputs $AIN_{ta-1}$ of one clock before the input $AIN_{ta}$. The register 207a-2 retains and outputs $AIN_{ta-2}$ of two clocks before the input $AIN_{ta}$. In a similar manner, the registers 207a-3 to 207a-n retain and output the delayed data corresponding to their position. Accordingly, from $AIN_{ta}$ to $AIN_{ta-n}$ are input into the selector 209a. Then, on the basis of the data stored in the data storage unit 208a, the selector 209a selects one from $AIN_{ta}$ to $AIN_{ta-n}$ and supplies the selected data to the operation circuit 105 via a signal line 219a.

Note that in a case where the clock gate control unit 210a cuts off the clock signal, the selector 209a selects the data AIN without a delay supplied from the input selection circuit 201, and the selected data is supplied to the operation circuit 105 via the signal line 219a.

In a similar manner to the registers 207a-1 to 207a-n retaining the input AIN received from the input selection circuit 201, the registers 207b-1 to 207b-n each retain an input BIN received from the input selection circuit 201. The connection relationship between the registers 207b-1 to 207b-n, the clock gate control unit 210b, the data storage unit 208b, and the selector 209b is essentially the same as the connection relationship between the registers 207a-1 to 207a-n, the clock gate control unit 210a, the data storage unit 208a, and the selector 209a. Accordingly, on the basis of the data stored in the data storage unit 208b, the selector 209b selects one from $BIN_{tb}$ to $BIN_{tb-n}$ and supplies the selected data to the operation circuit 105 via a signal line 219b. Also, in a case where the clock gate control unit 210b cuts off the clock signal, the selector 209b selects the data BIN without a delay supplied from the input selection circuit 201, and the selected data is supplied to the operation circuit 105 via the signal line 219b.

The operation circuit 105 includes an operation device 216 and a data storage unit 217. The data storage unit 217 stores data supplied from the circuit settings control unit 1503 when the load signal output from the timing control unit 1514 is high. Also, the data storage unit 217 retains stored data when the load signal is not high. The operation device 216 executes various types of operation processing based on the data stored in the data storage unit 217 on the AIN input via the signal line 219a and the BIN input via the signal line 219b. Then, the operation device 216 outputs the operation result data from an output terminal 203 of the ALU 102 via a signal line 218.

The types of operations that the operation device 216 can perform include the four arithmetic operations of addition, subtraction, multiplication, and division and bitwise logic operations including AND, OR, XOR, shift, and the like. In other words, the data storage unit 217 stores data indicating the various types of operations to be performed by the operation device 216. Note that the operation device 216 is not limited in terms of the types of operations that can be performed. For example, a highly coarse-grained operation device including a plurality of operation devices may be implement for finding the absolute value of a difference, for example.

Figure 3:
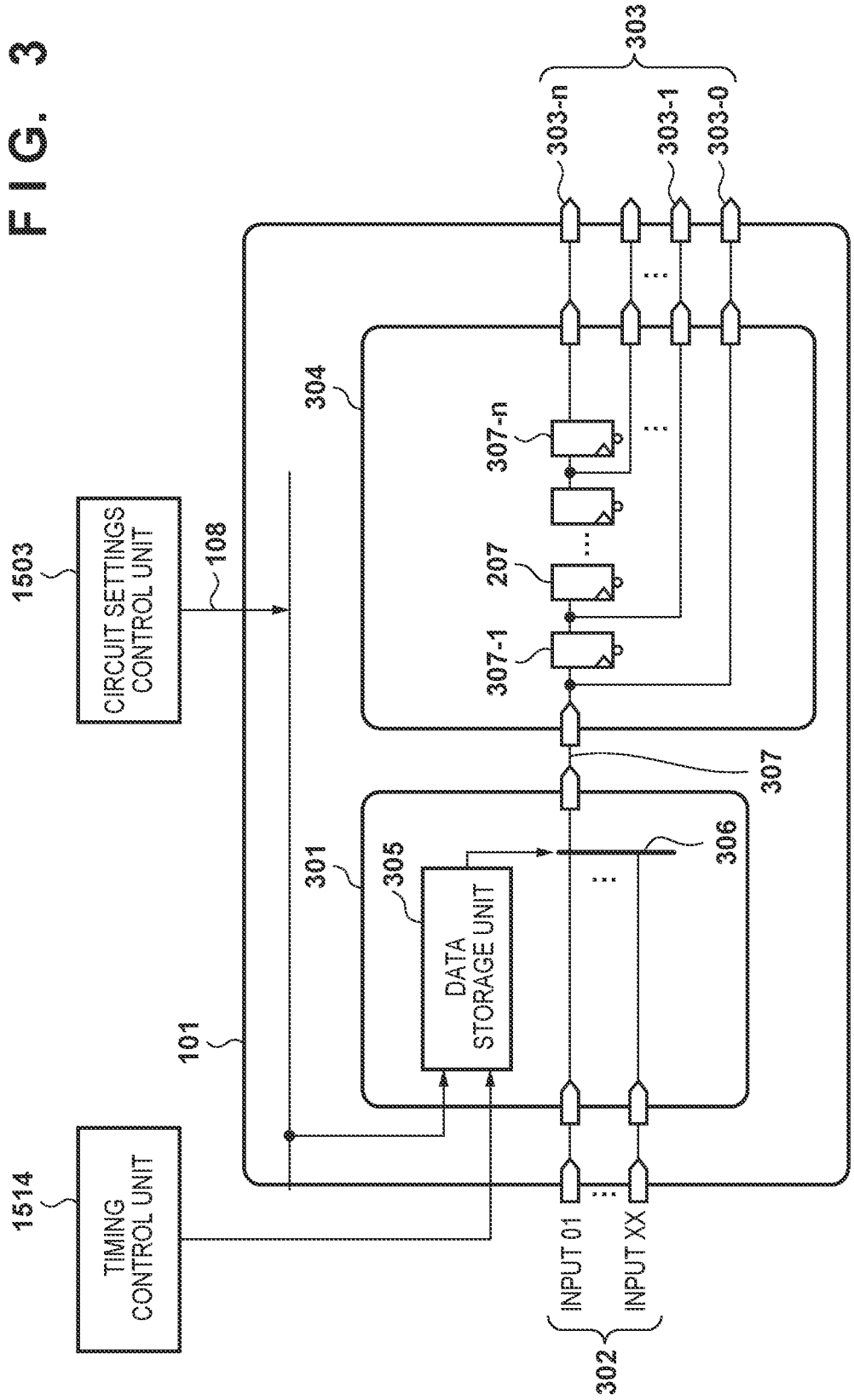
FIG. 3 is a block configuration diagram illustrating the configuration of a second ALU according to the first embodiment.

Next, the ALU 101 according to the embodiment will be described. FIG. 3 is a block diagram illustrating the configuration of the ALU 101 (1-input multi-output operation device) according to the first embodiment. The ALU 101 includes an input selection circuit 301 and a delay circuit 304.

The input selection circuit 301 includes a data storage unit 305 and a selector 306. The data storage unit 305 stores data supplied from the circuit settings control unit 1503 when the load signal output from the timing control unit 1514 is high and retains the stored data when the load signal is not high.

Then, the selector 306 selects one of a plurality of inputs 01 to xx indicated by reference sign 302 on the basis of the data stored in the data storage unit 305. In other words, the data storage unit 305 stores instruction data associated with selection for the selector 306. The selector 306 supplies the selected data to the delay circuit 304 via a signal line 307.

The delay circuit 304 includes a plurality of registers 307-1 to 307-$n$ daisy-chained. The delay circuit 304 outputs data without a delay supplied from the input selection circuit 301 to an output terminal 303-0. The register 307-1 latches the data supplied from upstream and outputs it to an output terminal 303-1 as data from one clock previous. In a similar manner, the registers 307-2 to 307-$n$ each output the latched data to the output terminals 303-2 to 303-$n$, respectively.

Here, the data received from the input selection circuit 301 is defined as $D_t$ and includes time information. In this case, the output terminal 303-0 outputs $D_t$. The output terminal 303-1 outputs $D_{t-1}$. The output terminal 303-2 outputs $D_{t-2}$. This follows in a similar manner, with the last output terminal 303-$n$ outputting $D_{t-n}$. In other words, the output terminal 303 outputs $D_t, D_{t-1}, \ldots, D_{t-n}$.

Thus ends the description of the structure of the two types of ALUs, ALU 101 and ALU 102, used in the embodiment.

Programmable Circuit Processing Example

To further facilitate understanding, an example where a system according to the embodiment is implemented in a digital camera will be described below.

Figure 12:
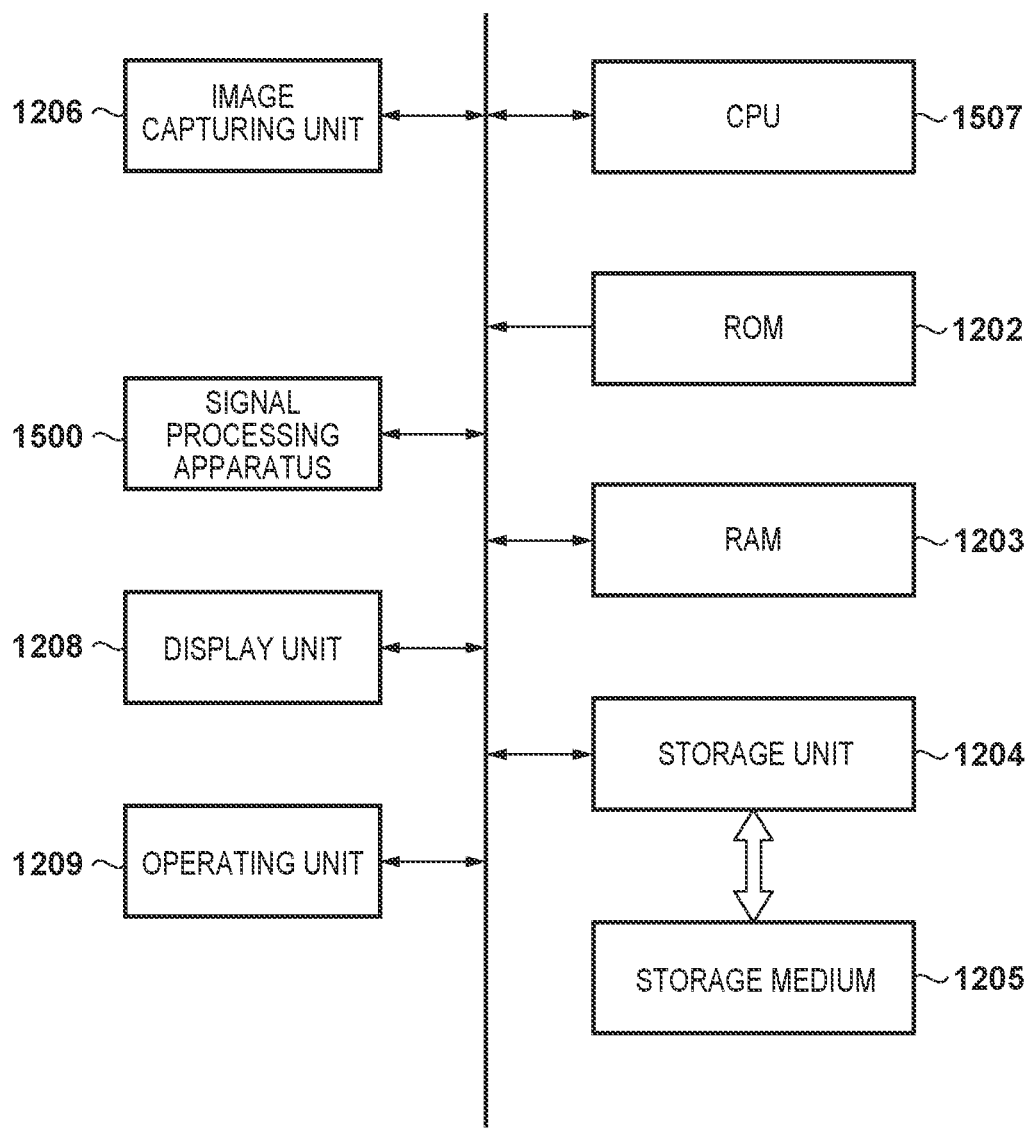
FIG. 12 is a block configuration diagram of an image capture apparatus to which an embodiment is applied.

FIG. 12 is a block configuration diagram of an image capture apparatus representing a digital camera to which the embodiment is applied. The image capture apparatus includes the CPU 1507, ROM 1202, RAM 1203, a storage unit 1204, an image capturing unit 1206, the signal processing apparatus 1500, a display unit 1208, and an operating unit 1209. The CPU 1507 controls the entire image capture apparatus. The ROM 1202 is a non-volatile memory that stores an operating system (OS) and image processing programs executed by the CPU 1507, various types of parameters, and the like. The RAM 1203 is memory, typically DRAM, that is used as the working area of the CPU 1507 and for loading the OS and the image processing programs executed by the CPU 1507. The storage unit 1204 executes processing to store the captured image data in a storage medium 1205 under the control of the CPU 1507. The storage medium 1205 is a writable non-volatile memory represented by an SD card but may be a medium fixed in the apparatus. The image capturing unit 1206 includes an optical lens, an image sensor, and the like and outputs an image signal obtained via image capture as digital image data. The display unit 1208 displays captured images and various types of menus under the control of the CPU 1507. The operating unit 1209 includes a switch, a button, a touch panel, or the like for transmitting instructions from the user to the CPU 1507. The display unit 1208 and the operating unit 1209 function as the user interface of the image capture apparatus.

With the configuration described above, when the power of the present apparatus is turned on, the CPU 1507 executes a program stored in the ROM 1202 and loads the OS on the RAM 1203. Then, the CPU 1507 loads an image processing application on the RAM 1203 and executes it to control the entire image capture apparatus.

In the specific example described below, a portion of the processing flow for forming a distance map by obtaining the defocus amount using a pupil dividing method using divided pixels on an image sensor by the image capturing unit 1206 may be executed by the signal processing apparatus 1500 including the programmable circuit of the embodiment. For the configuration of the image sensor with divided pixels and the method for obtaining the distance map corresponding to the parallax image, known techniques may be used, and these will not be described as they are not the main focus of the present embodiment.

The ROM 1202 and the RAM 1203 in FIG. 12 function as the memory 1515 in FIG. 1. Also, the RAM 1203 functions as the data storage units 1506$a$ and 1506$b$ and the external storage unit 1510 in FIG. 1.

Figure 4:
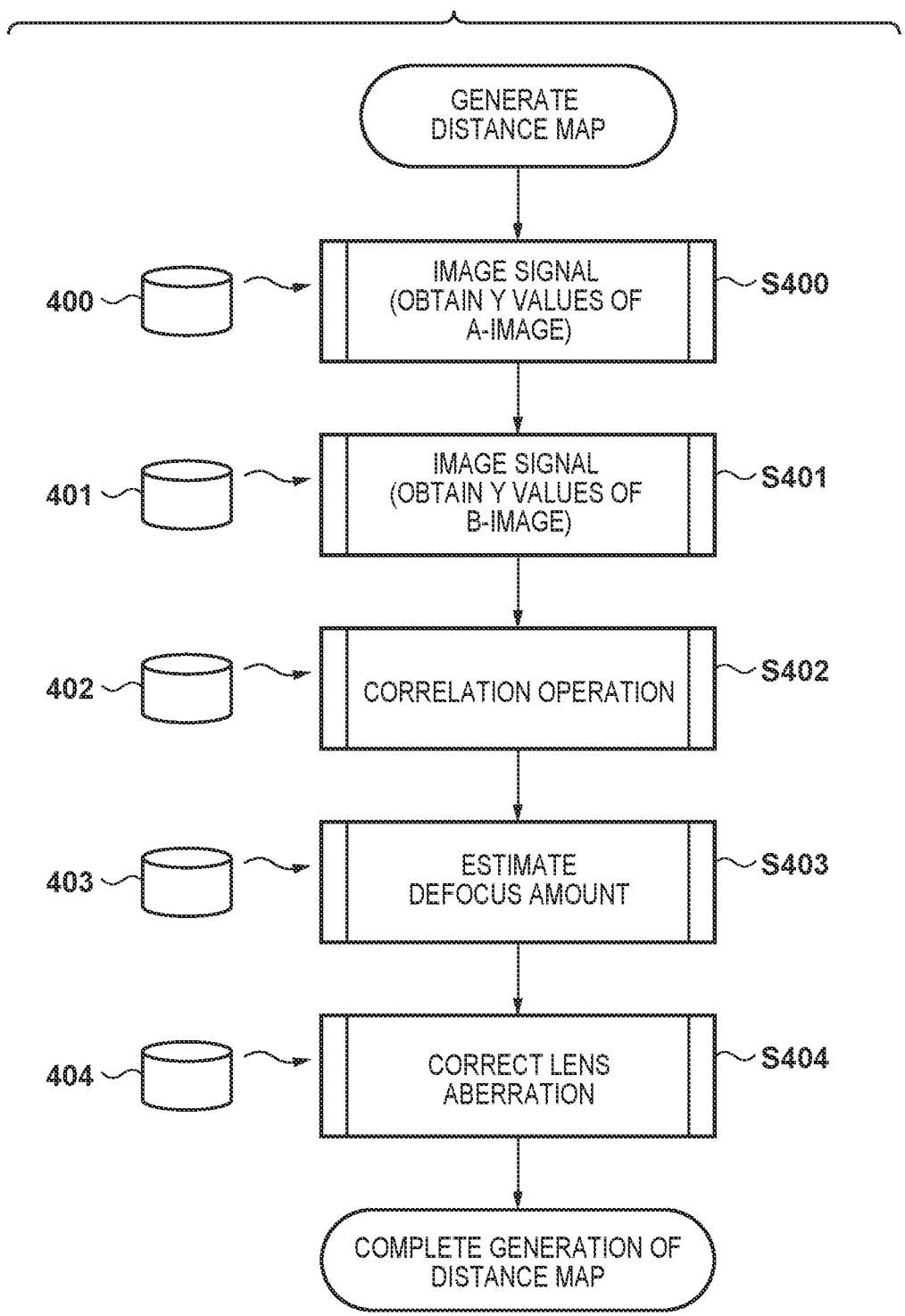
FIG. 4 is a flowchart illustrating the operations of the signal processing apparatus according to the first embodiment.

FIG. 4 is a flowchart of the processing executed by the CPU 1507 for generating a distance map by detecting the defocus amount from a parallax image obtained by the image capturing unit 1206. Obtaining parallax images from an imaging surface and distance map generation are well known techniques, and these will not be described as they are not the main focus of the embodiment.

On the imaging surface of the image sensor included in the image capturing unit 1206 to which the embodiment is applied to, a plurality of lenses are arranged in a matrix. Also, in a region of each lens, two photoelectric conversion units (a first and a second photoelectric conversion unit) are provided that convert the light incident via the lens into an electrical signal. Images formed from the signals detected at the plurality of first photoelectric conversion units are defined as A-images, and images formed from the signals detected at the plurality of second photoelectric conversion units are defined as B-images.

In step S400, the CPU 1507 obtains the brightness values (hereinafter, referred to as the Y values) from a signal of an A-image.

In step S401, the CPU 1507 obtains the Y values from a signal of a B-image.

In step S402, the CPU 1507 performs a correlation operation between the parallax images on the basis of the Y values obtained in steps S400 and S401.

In step S403, the CPU 1507 estimates the defocus amount from a relative image shift amount between the parallax images obtained via the correlation operation of step S402.

In step S404, the CPU 1507 corrects the defocus amount irregularity within the plane caused by the lens aberration.

In the processing described above, the CPU 1507 sets circuit settings 400 for the circuit settings control unit 1503 inside the signal processing apparatus 1500 for the processing of step S400. The circuit settings 400 include information indicating the data input source for causing the ALU 101 targeted for the settings to generate delayed data of the filter circuit targeted for configuration. Also, the circuit settings 400 include information, relating to the plurality of ALUs 102 that use the different delayed data output by the ALU 101, of the connection relationship, the types of operations, and the cutting off the supply of the clock signal by the clock gate control units 210a and 210b.

Also, the CPU 1507 executes the processing of step S401 by setting circuit settings 401 for the ALUs of the programmable circuit unit 1501 inside the signal processing apparatus 1500 and causing the circuit settings 401 to be executed. The information of the circuit settings 401 is similar to the circuit settings 400 in terms of the type of basic information, but the type of operation of the operation device included in the ALU 102 and the connection relationship between the ALUs is different.

Also, the CPU 1507 executes the processing of step S402 by setting circuit settings 402 for the ALUs of the programmable circuit unit 1501 inside the signal processing apparatus 1500 and causing the circuit settings 402 to be executed. The CPU 1507 executes the processing of step S403 by setting circuit settings 403 for the ALUs of the programmable circuit unit 1501 inside the signal processing apparatus 1500 and causing the circuit settings 403 to be executed. Furthermore, the CPU 1507 executes the processing of step S404 by setting circuit settings 404 for the ALUs of the programmable circuit unit 1501 inside the signal processing apparatus 1500 and causing the circuit settings 404 to be executed.

Note that the type of the circuit settings 400 to 404 is prestored in the data storage unit 1506a in FIG. 1. When the programmable circuit unit 1501 is initialized, the CPU 1507 transfers the information of the circuit settings 400 to 404 to the circuit settings storage unit 1513.

Specifically, the CPU 1507 instructs the circuit settings control unit 1503 to set the circuit settings 400 and start the processing. When the circuit settings control unit 1503 receives this instruction, the circuit settings control unit 1503 decodes the information of the circuit settings 400 and obtains a register setting value. Then, the circuit settings control unit 1503 transfers the obtained register setting value to the data storage units 204a, 204b, 210a, 210b, and 217, the clock gate control units 210a and 210b, or the data storage unit 305 of each of the ALUs to be used and causes operation processing to be executed based on the circuit settings 400. When the transfer and corresponding processing is completed, the CPU 1507 instructs the circuit settings control unit 1503 to set the circuit settings 401 and start the processing. When the circuit settings control unit 1503 receives this instruction, the circuit settings control unit 1503 decodes the information of the circuit settings 401 and obtains a register setting value. Then, the circuit settings control unit 1503 transfers the obtained register setting value to the data storage units 204a, 204b, 210a, 210b, and 217 illustrated in FIG. 2 and each data storage unit 305 in FIG. 3 and causes operation processing to be executed based on the circuit settings 401. This follows in a similar manner, with the CPU 1507 causing the circuit settings control unit 1503 to set the circuit settings 402, 403, and 404 in order and cause processing to be executed based on each.

Processing Example

An example of the configuration of a targeted circuit using a programmable circuit according to the present embodiment will now be described with reference to FIGS. 5A to 5C.

Note that in the example described above, the register 207a-n in FIG. 2 represents the data of n clocks before the register 207a-1. In the following example, the data of the most downstream register 207a-n will be described using time as a reference. In other words, using the time of the data retained by the register 207a-n as a reference, each register on the upstream side retains data of a later time. The registers 207b-1 to 207b-n and 307-1 to 307-n are similar in this example.

Figure 5A:
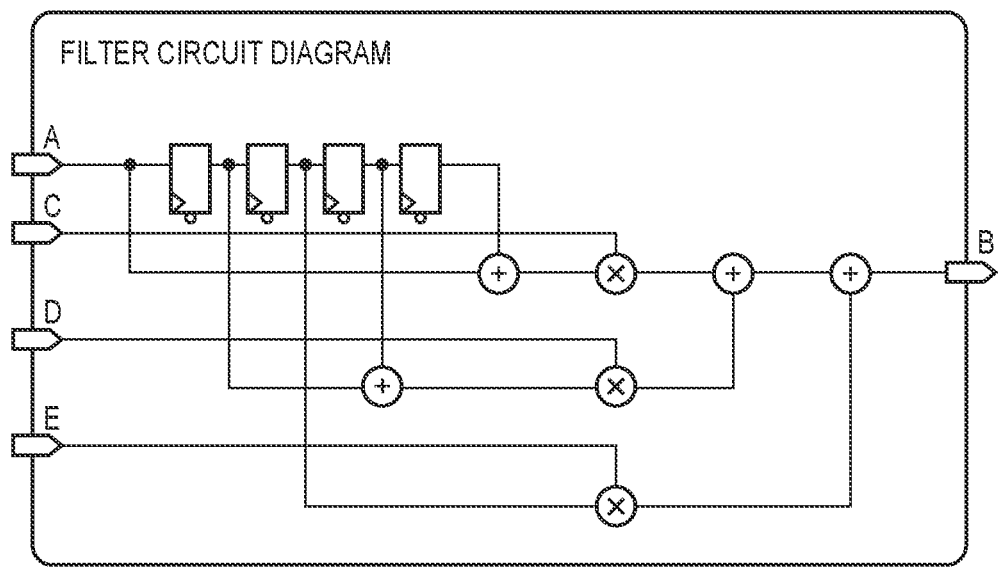

FIG. 5A is a diagram illustrating an equivalent circuit of a filter circuit implemented by reconfiguring the signal processing apparatus 1500 of the embodiment. The filter circuit in FIG. 5A is a 5-tap filter equivalent circuit that applies a filter to an input signal A and outputs a signal. The equivalent circuit, using the input signal A and coefficients C, D, and E, performs the following Formula (1) and outputs the operation result as an output signal B.

$$B=C*A(0)+D*A(1)+E*A(2)+D*A(3)+C*A(4) \tag{1}$$

A(0), A(1), A(2), A(3), and A(4) each represent the input signal A. Also, "*" indicates the multiplication operator. A(1) represents data of one clock after A(0), where A(0) is defined as the data output by the most downstream register from among the plurality of registers daisy-chained in FIG. 5A. In a similar manner, A(2) represents data of two clocks after A(0), A(3) represents data of three clocks after A(0), and A(4) represents data of four clocks after A(0). Using an example of an image to facilitate understanding, A(1) represents a pixel one after the pixel indicated by A(0).

By rearranging Formula (1), it is clear that Formula (1) can be changed into the following Formula (2).

$$B=C*\{A(0)+A(4)\}+D*\{A(1)+A(3)\}+E*A(2) \tag{2}$$

A detailed configuration of a case where the filter operation processing of Formula (2) is implemented using the signal processing apparatus 1500 of the embodiment is illustrated in FIG. 5C. FIG. 5C is a diagram illustrating the arrangement relationship between the one ALU 101 that delays the same signal different delay amounts and the plurality of ALUs 102. In FIG. 5C, "ALU 11" corresponds to the ALU 101, and "ALU 12" to "ALU 18" correspond to the ALU 102. In a case where the ALU 102 is used as the ALU 14, ALU 15, and ALU 16 in FIG. 5C, the input selection circuit 201 selects one of the inputs 202a and 202b and sets it to be inputted. For example, the input selection circuit 201 selects one of the plurality of pieces of input data from among the inputs 202a and outputs it as AIN. Also, the operation circuit 105 executes processing on the AIN to multiply the set coefficient.

As described above, the ALU 102 includes the built-in clock gate control units 210a and 210b. When the clock gate control unit 210a cuts off the supply of the clock signal to the registers 207a-1 to 207a-n, the registers 207a-1 to 207a-n essentially do not operate, and the power consumption is negligible or very low. In a similar manner, when the clock gate control unit 210b cuts off the supply of the clock signal to the registers 207b-1 to 207b-n, the registers 207b-1 to 207b-n essentially do not operate, and the power consumption is negligible or very low. The clock gate control unit 210a and the clock gate control unit 210b of each ALU 102 illustrated in FIG. 5C are set to cut off the supply of the clock signal. Thus, the operation circuit 105 of each ALU 102 performs an operation of the signal not delayed by the delay circuit 104. The reason a register is not illustrated in the "ALU 12" to "ALU 18" illustrated in FIG. 5C is because the clock gate control units 210a and 210b of each have cut off the supply of the clock signal.

Figure 5B:
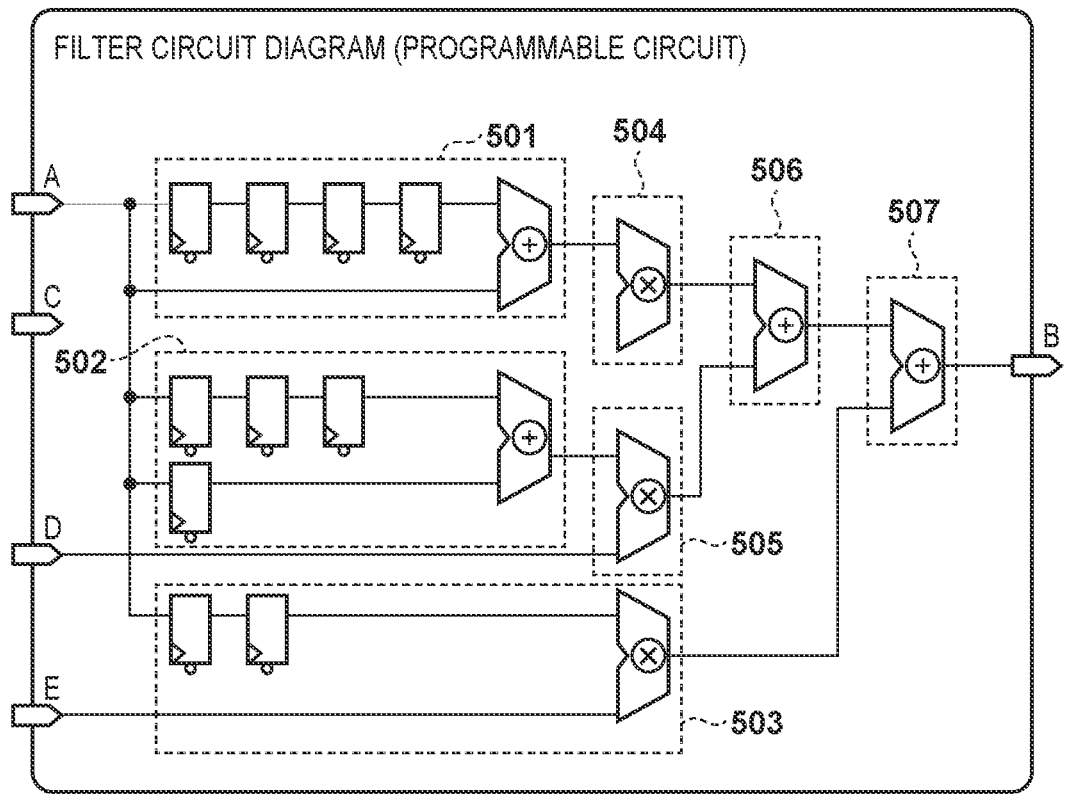

FIG. 5B is a diagram illustrating the equivalent circuit of FIG. 5A in a case where only ALUs with a built-in operation device including from 0 to 4 delay circuits are used. As illustrated in FIG. 5B, an ALU 501 includes four registers for delaying one of the two inputs. Also, an ALU 502 includes three registers for delaying one of the two inputs and one register for delaying the other input. An ALU 503 includes two registers for delaying one of the two inputs. Also, the ALUs 504 to 507 do not include a register. In the case of the filter circuit in FIG. 5B, a minimum of ten registers for delay are required. Also, in the case of FIG. 5B, the ALUs 504 to 507 can be the same type of circuit. However, the registers 501, 502, and 503 have different ways of delaying. Accordingly, in the example in FIG. 5B, at least four types of registers are required. Also, the registers 501, 502, and 503 have mutually different configurations for a delay register and do not have versatility. Furthermore, in the circuit configuration in FIG. 5B, the ALUs 501, 502, and 503 with a built-in delay circuit are required to adjust the operation timings with one another.

Alternatively, the filter circuit illustrated in FIG. 5C is configured of the two types of ALUs 101 and 102 described above. Also, only the "ALU 11" corresponding to the ALU 101 includes four registers for delay. The "ALU 12" to "ALU 18" are configured of the ALU 102, but the internal delay circuit 104 does not operate. In other words, the "ALU 12" to "ALU 18" can be used as an ALU essentially without a delay circuit and an equivalent circuit. Also, the "ALU 12" to "ALU 18" are not required to adjust the operation timing of the internal operation devices with one another.

In the case of the filter circuit in FIG. 5C, the number of operating registers is four, which is significantly lower than the number of registers of the filter circuit in FIG. 5B, which is 10. As a result, the filter circuit in FIG. 5C can have less power consumption than the filter circuit in FIG. 5B.

As described above, according to the present embodiment, a plurality of types of delayed data having different delay amount are generated by the ALU 101, and signals with delay amounts required for respective operations are output to the respective ALUs 102. Thus, at each ALU 102, there is no need to delay the input signal. This allows a signal processing apparatus to be provided that can have reduced power consumption by the clock signals for the register groups 207a and 207b being cut off at the plurality of ALUs 102 with a built-in operation device.

Note that in the embodiment described above, an image capture apparatus is used as an application example. However, the apparatus is only required to include the programmable signal processing apparatus 1500 and may be any type of apparatus such as an information processing apparatus represented by a PC.

Also, the programmable signal processing apparatus 1500 can be used as a circuit different from a filter such as the one illustrated in FIG. 5C. In a case where the programmable signal processing apparatus 1500 is used as the filter circuit illustrated in FIG. 5C, the registers of the ALU 102 stop operating. On the other hand, in a case where the programmable signal processing apparatus 1500 is used as a circuit different from a filter such as that one illustrated in FIG. 5C, depending on the contents of the processing, the supply of the clock to each register 207a-1 to 207a-n and 207b-1 to 207b-n of the ALU 102 should be controlled individually. Also, in this case, for example, as the output of the ALU 101, data without a delay should be selected and output.

Such control can be implemented by the circuit settings control unit 1503 controlling the circuit settings of the ALU 101 and the ALU 102.

Second Embodiment

Now, the second embodiment will be described. In the first embodiment described above, when configuring the targeted filter circuit, the ALU 101 that can output a plurality of signals with different delay amounts is used. Thus, since the delay circuits 104 of the ALUs 102 with a built-in operation device that take up the majority of the filter circuit are put in an essentially non-drive state, the power consumption is reduced.

However, the ALU 101 is not provided with an operation device and has little versatility. Thus, there is a probability of there being little demand for it as a programmable circuit. In regards to this, in the present second embodiment described below, ALU of one type of a 2-input multi-output with the combined function of both an operation circuit and a delay control provides the function of the ALU 101. This allows versatility to be retain while also allowing the power consumption to be reduced in a similar manner to the first embodiment.

Note that the ALU described in the present second embodiment is based on the ALU 102 described in the first embodiment, and the same reference signs will be used.

Figure 6:
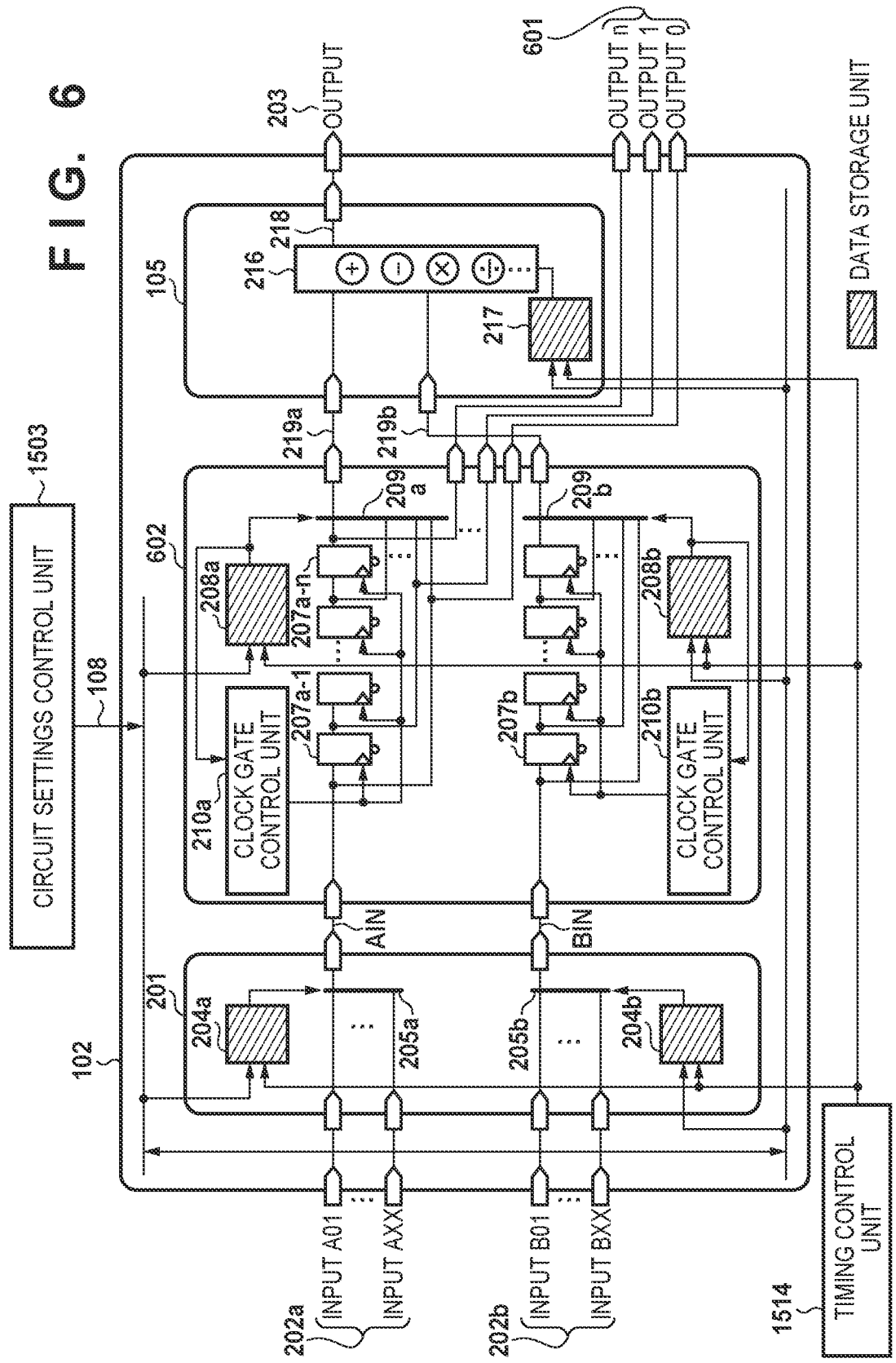
FIG. 6 is a block configuration diagram illustrating the configuration of a second ALU according to a second embodiment.

FIG. 6 is a diagram illustrating the configuration of the ALU 102 according to the present second embodiment. The ALU 102 includes the input selection circuit 201, a delay circuit 602, and the operation circuit 105. The input selection circuit 201 is as in the first embodiment and outputs the two selected inputs as AIN and BIN to the delay circuit 602.

As with the delay circuit 104 in FIG. 2, the delay circuit 602 outputs signals 219a and 219b delayed by the delay amount set for AIN and BIN, respectively, on the basis of the circuit settings stored in the data storage units 208a and 208b. Furthermore, the delay circuit 602 according to the present second embodiment outputs n+1 number of (delayed) signals corresponding to the AIN and delayed by the delay amounts 0 to n from output terminals 601.

Also, the operation circuit 105 is input with, from among the outputs of the delay circuit 602, the signals 219a and 219b, performs various types of operations specified by the data stored in the data storage unit 217, and outputs the operation result from the output terminal 203 via the signal line 218. In other words, the ALU 102 according to the present second embodiment includes, in addition to the output terminal 203 that outputs the operation result, the output terminals 601 that output n+1 number of delayed signals corresponding to the AIN delayed by the delay amounts 0 to n. Note that the ALU 102 in FIG. 6 is configured to output delay signals from the AIN side, but may be configured with BIN as the delay target.

The ALU 102 according to the present second embodiment can output the operation result in addition to the delayed signals that correspond to the input being delayed by a plurality of delay amounts. Thus, compared to the ALU 102 according to the first embodiment, the versatility is high.

In the case of configuring the circuit in FIG. 5C according to the present second embodiment, the circuit can be configured using only the one type of ALU 102 illustrated in FIG. 6. In other words, the delay signals 601 of the ALU 102 in FIG. 6 may be used as the data of each delay amount for the "ALU 11" in FIG. 5C. Also, as the "ALU 12" to "ALU 18" in FIG. 5C, the operation circuit 105 of the ALU 102 in FIG. 6 may be used. However, in a case where the "ALU 12" to "ALU 18" in FIG. 5C are used, the circuit settings control unit 1503 stores the data for controlling the selectors 209a and 209b to each select a signal without a delay in the data storage units 208a and 208b inside each ALU. Furthermore, the circuit settings control unit 1503 sets the clock gate control units 210a and 210b to cut off the supply of clock signals.

As described above, the present second embodiment can provide a signal processing apparatus that can retain versatility and reduce power consumption with a configuration of only one type of ALU having an operation function.

Third Embodiment

Now, the third embodiment will be described. In the first embodiment, the delay circuit 104 of the ALU 102 has a configuration that delays each of the two signals AIN and BIN by a desired delay amount in order to increase the versatility of the ALU. In the present third embodiment described below, by reducing the number of signals to be delayed by a delay circuit by one, the circuit size of the delay circuit in the ALU 102 is reduced, and the versatility of the ALU 101 and the ALU 102 in combination is not reduced.

Figure 7:
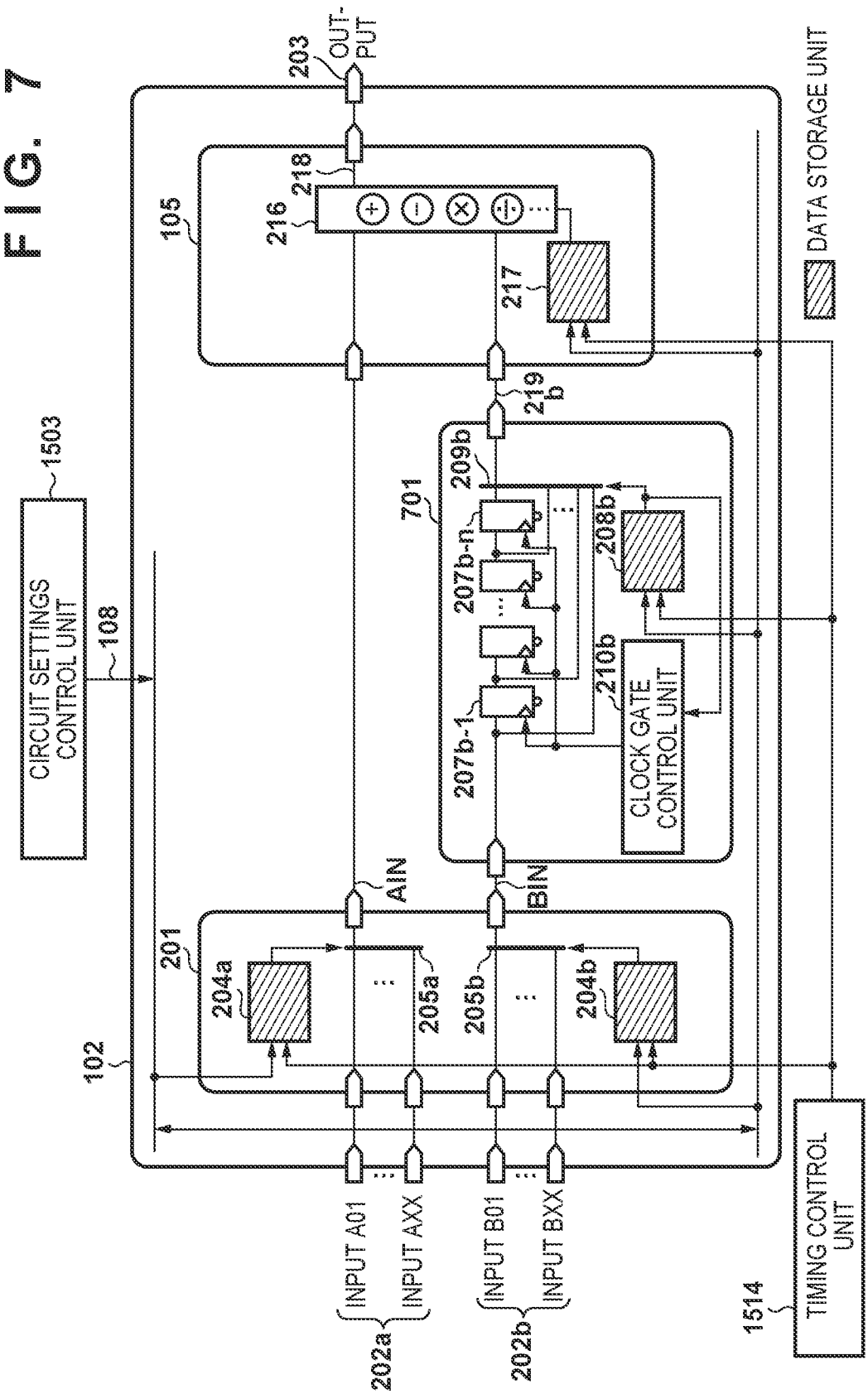
FIG. 7 is a block configuration diagram illustrating the configuration of a second ALU according to a third embodiment.

FIG. 7 is a diagram illustrating the configuration of the ALU 102 according to the present third embodiment. The ALU 102 includes the input selection circuit 201, a delay circuit 701, and the operation circuit 105.

The input selection circuit 201 has the same reference signs and the same configuration as in FIG. 2 and outputs the two selected AIN and BIN. However, the input selection circuit 201 according to the third embodiment supplies AIN directly to the operation circuit 105. Also, the input selection circuit 201 according to the third embodiment supplies BIN to the delay circuit 701.

The delay circuit 701 includes the registers 207b-1 to 207b-n for delay, the selector 209b, the data storage unit 208b, and the clock gate control unit 210b. In other words, the delay circuit 701 has the same configuration as the configuration for delaying the input BIN in FIG. 2. Accordingly, in a state where the clock gate control unit 210b is supplying the clock signal, the selector 209b can select and output any one of the BINs delayed by 0 to n clock. Also, in a state where the clock gate control unit 210b is cutting off the supply of the clock signal, the selector 209b selects and outputs the BIN without a delay.

In a case where the filter circuit illustrated in FIG. 5C is configured of the programmable circuit unit 1501 according to the present embodiment, the ALU 102 according to the present third embodiment can be used as the "ALU 12" to "ALU 18" if the clock gate control unit 210b is set to cut off the supply of the clock signal.

Figure 8:
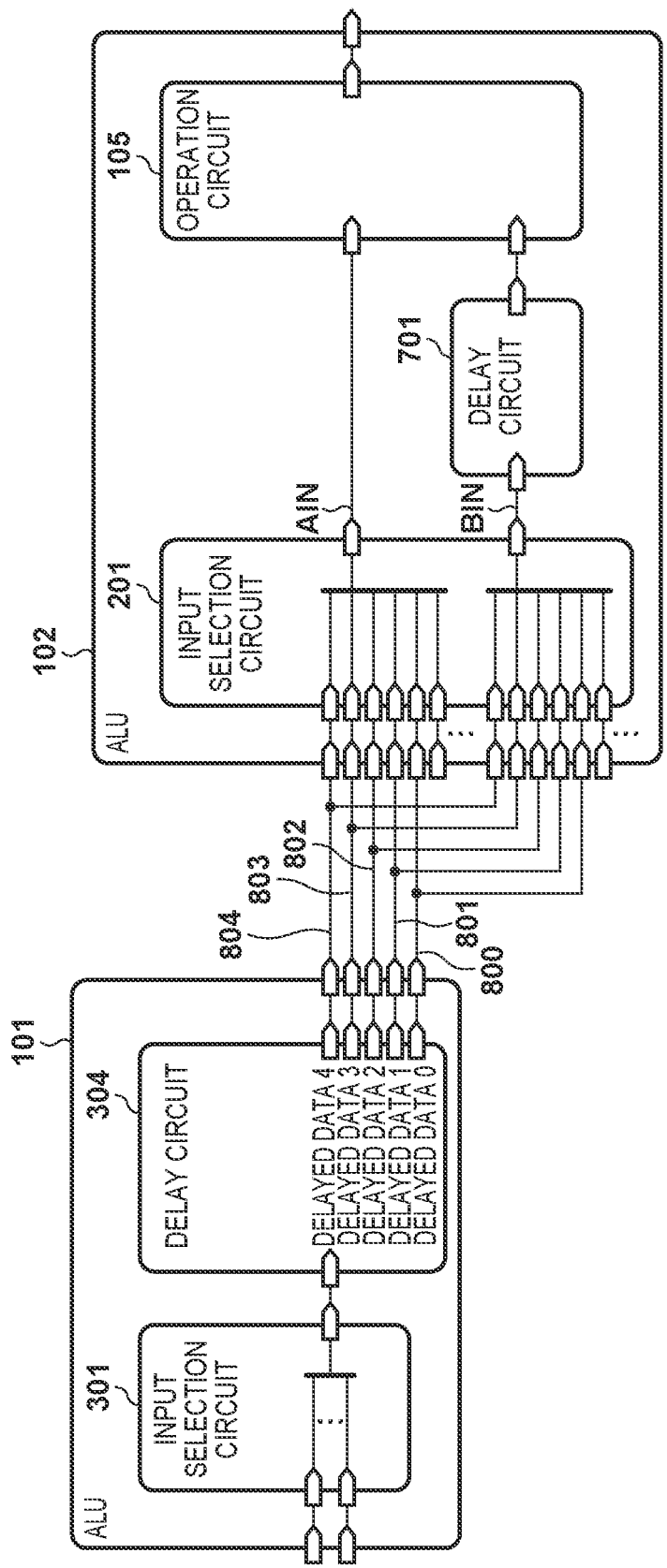
FIG. 8 is a block configuration diagram illustrating the connection of a first and second ALU according to the third embodiment.

An example of a configuration where a circuit other than a filter is configured of the programmable circuit unit 1501 and delay is required on the AIN side of the ALU 102 will be described with the operation timing of the signals on the AIN side of the ALU 102 being adjustable. In the case of delaying the signals on the AIN side of the ALU 102, by selecting a signal delayed by the desired delay amount at the ALU 101, the timing of the signal on which an operation is performed at the ALU 102 can be adjusted. FIG. 8 is a diagram illustrating a configuration in the case of delaying a signal on the AIN side in the ALU 102. The ALU 101 performs a delay at the delay circuit 304 on the signal selected at the input selection circuit 301 and outputs signals 800 to 804 with delay amounts from 0 to 4. The ALU 102 is connected in a manner allowing the signals 800 to 804 to be selected at the input selection circuit 201.

In a case where timing adjustment is performed on the AIN side signals of the ALU 102, the circuit settings are such that, from among the signals 800 to 804, a signal with a predetermined delay amount is selected at the input selection circuit 201. Here, an example where a certain signal is delayed by a delay amount of 3 and input to the operation circuit 105 will be described. The signal wished to be processed is selected at the input selection circuit 301 of the ALU 101, and the delay circuit 304 outputs a signal delayed by the delay amounts 0 to 4. By setting the signal 803 to be selected at the input selection circuit 201, the ALU 102 can implement timing adjustment even of a signal on the AIN side where the ALU 102 includes no delay circuit.

As described above, the present third embodiment can provide a signal processing apparatus that can have a reduced circuit size without a reduction in versatility as a programmable circuit by using a configuration where one of the two inputs of the ALU 102 is not provided with a delay circuit.

Fourth Embodiment

Next, the fourth embodiment will be described. In the first embodiment, the power consumption of the delay circuit of the ALU 102 having the output of the ALU 101 as an input is reduced by using the ALU 101 that can output a plurality of delay amounts. In the present embodiment described below, the ALU use ratio of the programmable circuit unit 1501 is reduced by using a configuration where the ALU 101 adds together predetermined delay amounts.

Figure 9:
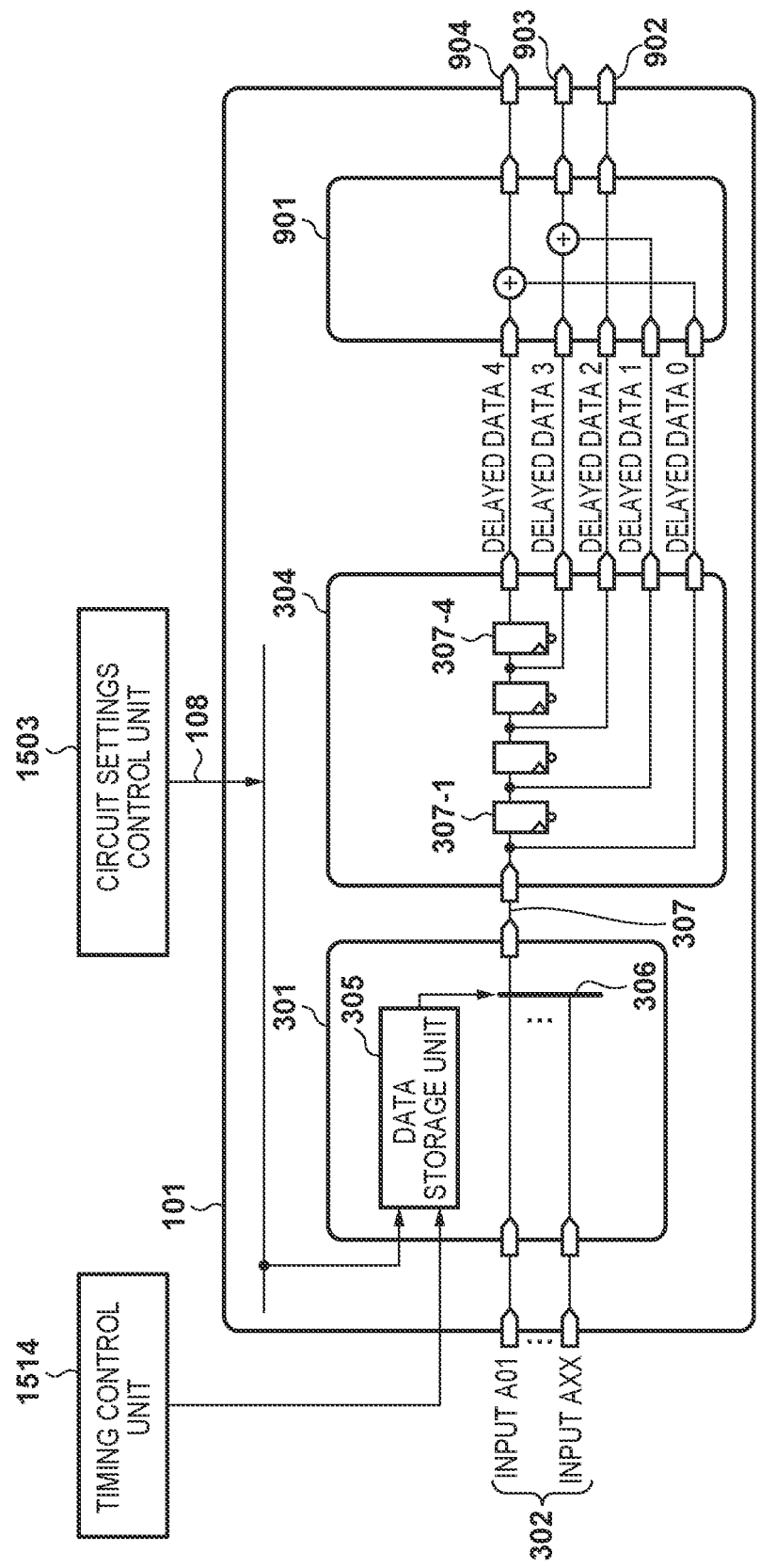
FIG. 9 is a block configuration diagram illustrating the configuration of a first ALU according to a fourth embodiment.

FIG. 9 is a diagram illustrating the configuration of the ALU 101 according to the present fourth embodiment. The ALU 101 includes the input selection circuit 301, the delay circuit 304, and an adder circuit 901.

The input selection circuit 301 has the same reference signs and the same configuration as in FIG. 3. In other words, the selector 306 selects one of the plurality of inputs 01 to xx indicated by the reference sign 302 on the basis of the circuit settings stored in the data storage unit 305 and supplies the selected data to the delay circuit 304 via the signal line 307.

The delay circuit 304 delays the data received from the input selection circuit 301 via the signal line 307 at the register groups 307-1 to 307-4 and supplies five pieces of delayed data 0 to 4 including the delay amount 0 to the adder circuit 901.

The adder circuit 901 is input with the delayed data 0 to 4 from the delay circuit 304 and performs addition on the two pieces of delayed data with symmetrical delay amounts from the data with a median delay amount based on the maximum delay amount of the delay circuit 304. In FIG. 9, the maximum delay amount of the delay circuit 304 is 4, and the signal with a delay amount of 2 is the center. Thus, the delay amount 0 and the delay amount 4 and the delay amount 1 and the delay amount 3 are added together and output. The adder circuit 901 outputs the signal with the delay amount 2, which is the center, as is.

The ALU 101 according to the present fourth embodiment outputs three results of the operations at the adder circuit 901 from terminals 902 to 904.

Figure 11:
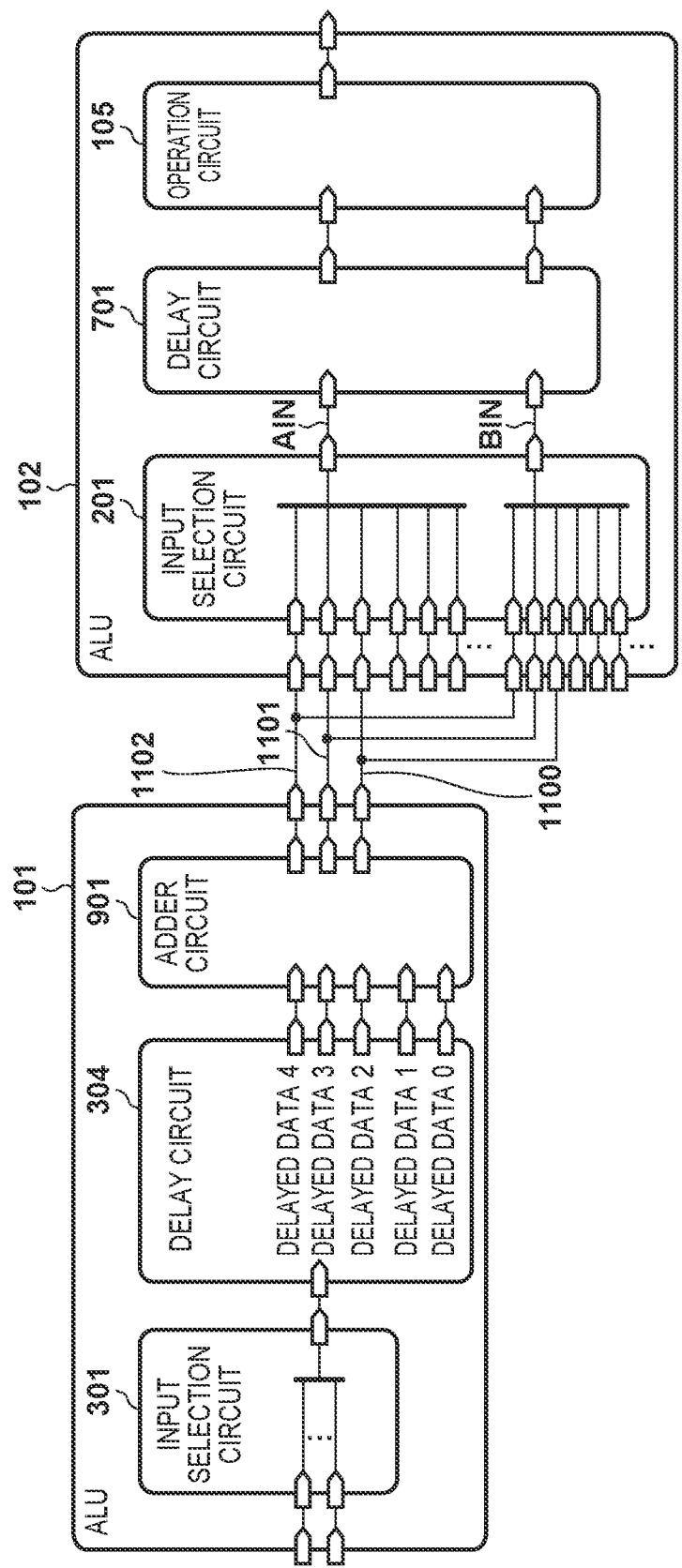
FIG. 11 is a block configuration diagram illustrating the connection of a first and second ALU according to the fourth embodiment.

A connection example of a programmable circuit according to the present fourth embodiment will now be described using FIG. 11. The ALU 101 outputs the results of the operations at the adder circuit 901 as signals 1100 to 1102. At the ALU 102, as the input on the AIN side and the BIN side, the signals 1100 to 1102 are input. In a case where, from among the signals 1100 to 1102, one or two are used to perform an operation, the desired signal/s are selected at the input selection circuit 201.

Processing Example

An example of the configuration of a programmable circuit according to the present fourth embodiment will now be described with reference to FIGS. 10A and 10B.

Figure 10A:
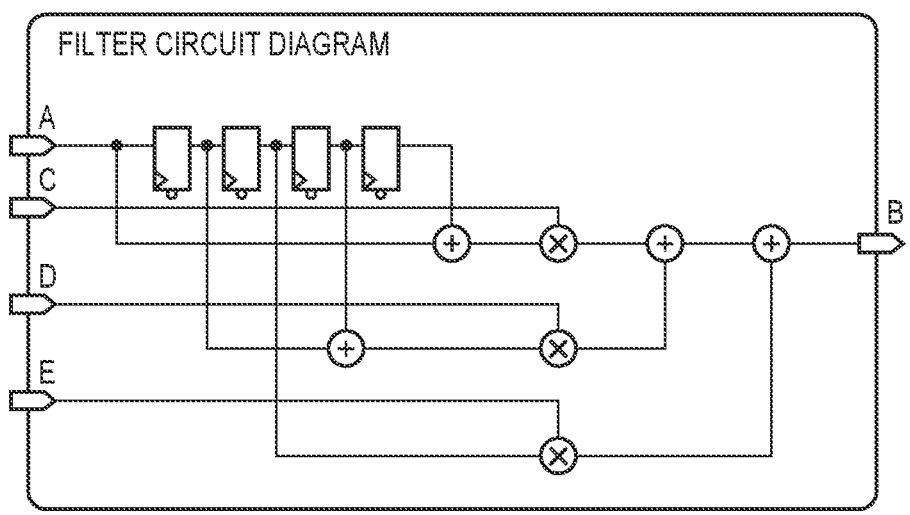
FIGS. 10A and 10B are block configuration diagrams illustrating the configuration of a filter circuit according to the fourth embodiment.
Figure 10B:
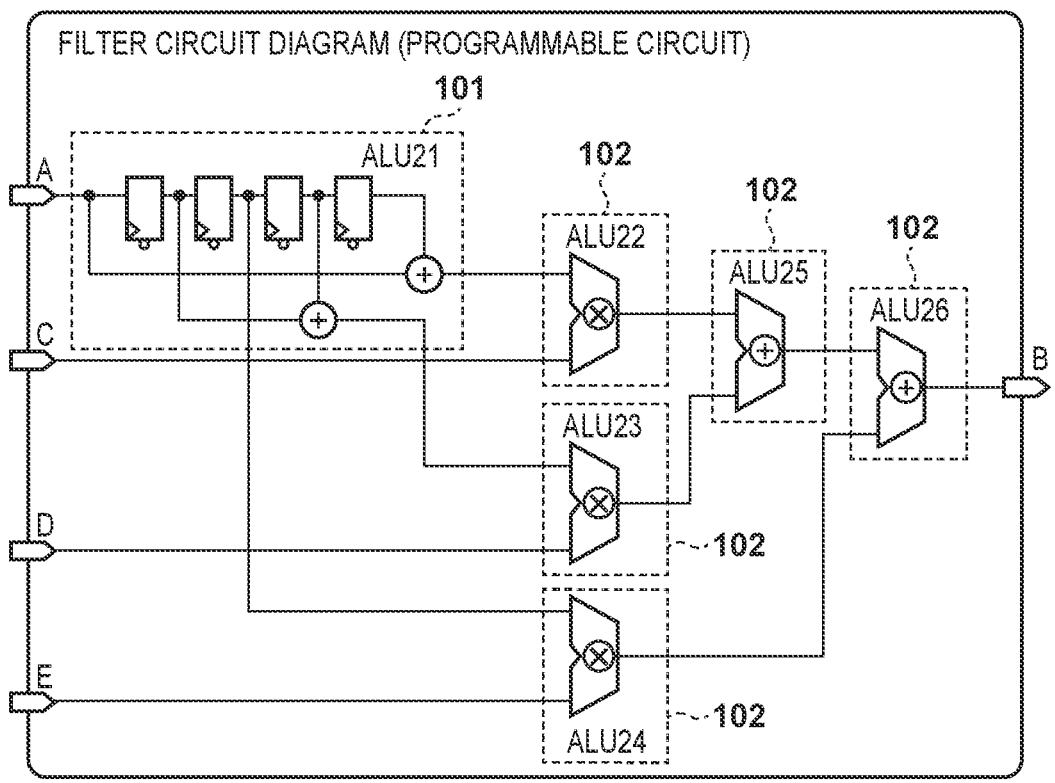

FIG. 10A is a diagram illustrating an equivalent circuit of a filter circuit similar to that illustrated in FIG. 5A. Also, FIG. 10B is a diagram illustrating the arrangement relationship of the ALU 101 and the ALU 102 according to the present fourth embodiment in a case where the filter circuit in FIG. 5C is configured of a programmable circuit. As illustrated in FIG. 10B, ALU 21 is configured to as the ALU 101, and ALU 22 to 26 are configured as the ALU 102.

In the present embodiment, the ALU 101 can add together signals with predetermined delay amounts. The operations performed in the first embodiment by the ALUs 12 and 13 as illustrated in FIG. 5C can be performed by the ALU 21 in the present embodiment. Thus, the filter processing using eight ALUs in the first embodiment can be executed with the reduced number of six ALUs in the present embodiment, allowing the ALU use ratio to be reduced.

As described above, the present embodiment can provide a signal processing apparatus that can have a reduced ALU use ratio of a programmable circuit by the ALU 101 being configured to add together signals with predetermined delay amounts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-182060, filed on Nov. 14, 2022, which is hereby incorporated by reference herein in its entirety.

What is claimed is:

1. A programmable signal processing apparatus comprising:
    a plurality of arithmetic logic units (ALUs);
    a CPU; and
    a memory that stores a program that, when executed by the CPU, causes the programmable signal processing apparatus to function as:
    a control unit configured to set settings for configuring a targeted circuit using the plurality of ALUs on a basis of information relating to settings for a connection relationship of the plurality of ALUs and information relating to settings for each one of the plurality of ALUs, wherein
    the plurality of ALUs include a first type of ALU and a second type of ALU,
    the first type of ALU includes
        a first selection circuit that selects input data, and
        a first delay circuit that delays input data selected by the first selection circuit based on a clock signal and outputs a plurality of pieces of data with different delay amounts,
    the second type of ALU includes
        a second selection circuit that selects two pieces of data from a plurality of pieces of data including the plurality of pieces of data with different delay amounts from the first type of ALU and output data from another second type of ALU, according to settings set by the control unit, and outputs the two pieces of data as first data and second data,
        a second delay circuit that delays at least one of the first data and the second data by an amount according to the settings using a plurality of daisy-chained registers and then outputs the at least one of the first data and the second data, and
        an operation circuit that performs an operation according to the settings set by the control unit on data output from the second delay circuit,
    the second delay circuit
        includes a clock gate control circuit that controls supply and cutoff of a clock signal to the plurality of registers, and
        outputs the at least one of the first data and the second data without a delay in a state where supply of the clock signal to the plurality of registers is cut off.

2. The programmable signal processing apparatus according to claim 1, wherein the control unit controls the clock gate control circuit to cut off a clock signal to the plurality of registers in a case where the control unit sets the second type of ALU to select one of the plurality of pieces of data with different delay amounts output from the first type of ALU.

3. The programmable signal processing apparatus according to claim 1, wherein in a case where the control unit sets one of the second type of ALUs that is located upstream from another one of the second type of ALUs to select one of the plurality of pieces of data with different delay amounts output from the first type of ALU, the control unit controls the clock gate control circuit of the other one of the second type of ALUs to cut off a clock signal to the plurality of registers of the other one of the second type of ALUs.

4. The programmable signal processing apparatus according to claim 1, wherein
    the second delay circuit included in the second type of ALU delays each of the first data and the second data output from the second selection circuit using the plurality of daisy-chained registers, and the clock gate control circuit includes
  a first gate control circuit that controls supply and cutoff of a clock signal to the plurality of registers for delaying the first data, and
  a second gate control circuit that controls supply and cutoff of a clock signal to the plurality of registers for delaying the second data.

5. The programmable signal processing apparatus according to claim 1, wherein the second delay circuit included in the second type of ALU outputs one of the first data and the second data without a delay, and outputs the other with a delay using the plurality of daisy-chained registers.

6. The programmable signal processing apparatus according to claim 1, wherein the first type of ALU further includes a plurality of operation circuits that performs an operation on two preset pieces of data from among the plurality of pieces of data with different delay amounts output from the first delay circuit.

7. The programmable signal processing apparatus according to claim 1, wherein the programmable signal processing apparatus is a single chip IC.

8. The programmable signal processing apparatus according to claim 1,
  wherein the targeted circuit is a filter circuit, and
  wherein the control unit
    sets information for generating data with different delay amounts to be used by the filter circuit to the first type of ALU, and
    for each of a plurality of the second type of ALUs, so that the plurality of the second type of ALUs use the data with different delay amounts output from the first type of ALU, sets a type of operation, and sets the clock gate control circuit to cutoff a clock signal.

9. A programmable signal processing apparatus comprising:
  a plurality of arithmetic logic units (ALUs);
  a CPU; and
  a memory that stores a program that, when executed by the CPU, causes the programmable signal processing apparatus to function as:
    a control unit configured to set settings for configuring a targeted circuit using the plurality of ALUs on a basis of information relating to settings for a connection relationship of the plurality of ALUs and information relating to function settings for each one of the plurality of ALUs, wherein
  each of the plurality of ALUs includes
    a selection circuit that selects two pieces of data from a plurality of pieces of data including data from another one of the plurality of ALUs according to settings set by the control unit, and outputs the two pieces of data as first data and second data,
    a delay circuit that delays each of the first data and the second data output from the selection circuit with a delay amount according to the settings set by the control unit,
    an operation circuit that performs an operation, of which type is according to the settings set by the control unit, on the first data and the second data output from the delay circuit, and
    a plurality of output terminals that outputs an operation result of the operation circuit, and outputs a plurality of pieces of data with different delay amounts of one of the first data and the second data delayed by the delay circuit.

10. The programmable signal processing apparatus according to claim 9, wherein the targeted circuit is a filter circuit, and
  wherein the control unit
    sets at least one of the plurality of ALUs as ALU(s) for generating delayed data for generating delayed data with different delay amounts that are to be used by the filter circuit, and
    for each of the plurality of ALUs, so that the plurality of ALUs use the data with different delay amounts generated by the ALU(s) for generating delayed data, sets a type of operation, and sets supply or cutoff of a clock signal to the delay circuit.

* * * * *